United States Patent
Ahn et al.

(10) Patent No.: US 12,046,109 B2
(45) Date of Patent: Jul. 23, 2024

(54) METHOD AND APPARATUS FOR CONDUCTING FAIR LOTTERY WHILE REDUCING TRANSACTION COST BY USING BLOCKCHAIN NETWORK

(71) Applicant: B-square Lab Co., Ltd, Seoul (KR)

(72) Inventors: Kye Hyuk Ahn, Bucheon-si (KR); Chang Yong Kim, Yongin-si (KR)

(73) Assignee: B-SQUARE LAB CO., LTD, Seoul (KR)

( * ) Notice: Subject to any disclaimer, the term of this patent is extended or adjusted under 35 U.S.C. 154(b) by 307 days.

(21) Appl. No.: 17/481,795

(22) Filed: Sep. 22, 2021

(65) Prior Publication Data

US 2022/0005311 A1    Jan. 6, 2022

Related U.S. Application Data

(63) Continuation-in-part of application No. PCT/KR2020/003922, filed on Mar. 23, 2020.

(30) Foreign Application Priority Data

Mar. 22, 2019  (KR) ........................ 10-2019-0033212

(51) Int. Cl.
*G07F 17/32* (2006.01)
*G07C 15/00* (2006.01)

(52) U.S. Cl.
CPC ......... *G07F 17/329* (2013.01); *G07C 15/006* (2013.01); *G07F 17/323* (2013.01)

(58) Field of Classification Search
None
See application file for complete search history.

(56) References Cited

U.S. PATENT DOCUMENTS

| | | | |
|---|---|---|---|
| 2018/0096752 | A1 | 4/2018 | Ovalle |
| 2018/0247191 | A1 | 8/2018 | Katz et al. |

FOREIGN PATENT DOCUMENTS

| | | |
|---|---|---|
| JP | 10-207971 A | 8/1998 |
| JP | 2017-157910 A | 9/2017 |
| JP | 2019-040621 A | 3/2019 |
| KR | 10-2017-0137661 A | 12/2017 |
| KR | 10-1928087 B1 | 2/2019 |

*Primary Examiner* — Damon J Pierce
(74) *Attorney, Agent, or Firm* — United One Law Group LLC; Kongsik Kim; Jhongwoo Peck

(57) ABSTRACT

A method for conducting a lottery transparently and fairly while using a blockchain at a low cost by performing fewer transactions is provided. The method includes: obtaining lottery participation requests; generating a lottery pool; generating representative lottery pool information, and then transmitting the representative lottery pool information to a blockchain network; registering the transmitted representative lottery pool information or processed information thereof in the blockchain network; requesting a lottery smart contractor to generate a winning reference number and to register the winning reference number in the blockchain network; and determining a selected lottery participation request as a winner based on the winning reference number.

16 Claims, 4 Drawing Sheets

METHOD AND APPARATUS FOR CONDUCTING FAIR LOTTERY WHILE REDUCING TRANSACTION COST BY USING BLOCKCHAIN NETWORK

CROSS-REFERENCE TO RELATED APPLICATION

This application is a Continuation-in-part of International Application No. PCT/KR2020/003922 filed on Mar. 23, 2020, which claims priority to Korean Application No. 10-2019-0033212 filed on Mar. 22, 2019. The aforementioned applications are incorporated herein by reference in their entireties.

TECHNICAL FIELD

The present invention relates to a method of performing a fair lottery while reducing transaction costs using a blockchain network.

BACKGROUND

It is not easy to fairly distribute limited resources, such as popular liberal arts classes that everyone wants to register, concert seats for world stars, and high-speed train tickets for holidays. In most cases, a simple digital first-come-first-served method is used to distribute such limited resources, and the resources are distributed to those who apply over the Internet earlier. However, the digital first-come-first-served method has a problem in that the winner is determined by unreasonable factors such as the Internet speed in the corresponding area and the operation speed of the computer.

One of various experimental methods proposed to replace the above-mentioned method is a random lottery method. By receiving applications for obtaining the corresponding resource for a set period of time and randomly determining winners among them, the method provides an advantage of being free of the unreasonable factors described above. However, the disadvantage of this method is that the lottery process is not transparent, so it is difficult to gain trust from the applicants. In other words, when the lottery is performed internally within the server, the applicants may not trust the lottery process because, for example, the person in charge of the lottery may select a particular applicant as a winner with a bias.

SUMMARY

An object of the present invention is to provide a method for performing a fair lottery while reducing transaction costs using a blockchain network to allow resources to be distributed in an equitable way such that the applicants can trust the lottery process.

Blockchain technology is a technology that prevents data tampering based on distributed computing by storing data to be managed in a block, which is a chain-type distributed data storage environment based on the P2P technology.

According to an aspect of the present invention, there is provided a method of performing a lottery transparently and fairly while using a blockchain at a low cost by performing fewer transactions. The method may include obtaining a plurality of lottery participation requests; generating a lottery pool by assigning pool table values to the plurality of lottery participation requests; generating at least one representative lottery pool information using information associated with the lottery pool, and transmitting the generated representative lottery pool information to a blockchain network; registering the transmitted representative lottery pool information or processed information thereof in the blockchain network; requesting a lottery smart contract previously registered in the blockchain network to generate at least one winning reference number and to register the winning reference number in the blockchain network; and determining at least one selected lottery participation request as a winner among the plurality of lottery participation requests with reference to the winning reference number.

In some embodiments, the method may further include requesting the lottery smart contract to transmit the winning reference number to a service server or to another device such that the determining at least one selected lottery participation request as a winner may be performed by the service server or the another device.

In some embodiments, the representative lottery pool information that represents the lottery pool may be generated by applying at least one hash operation to the information associated with the lottery pool after extracting the information.

In some embodiments, for generating the winning reference number, the lottery smart contract may be configured to generate a random seed value using information on the blockchain network, and to generate the winning reference number using the random seed value.

In some embodiments, the information on the blockchain network may include at least some of (i) miner's address information of a particular block included in the blockchain network, (ii) difficulty information of the particular block, (iii) gas limit information of the particular block, (iv) number information of the particular block, (v) timestamp information corresponding to the particular block, and (vi) a particular hash value corresponding to the particular block.

In some embodiments, the lottery smart contract may be configured to generate a winning sequence that includes a plurality of winning reference numbers by performing a pseudo-random number generation using the random seed value.

In some embodiments, the lottery smart contract may be configured to perform the pseudo-random number generation according to an equation, $$X_{n+1} = (aX_a + c) \bmod M$$

where a and c are arbitrary constants, M is a number equal to or greater than a number of lottery participation requests, and $X_{n+1}$ and $X_n$ are numbers that are recursively generated using the equation starting from $X_0$, which corresponds to the random seed value.

In some embodiments, selected lottery participation requests may be determined by obtaining the generated winning reference numbers in an order of generation, and by applying a modular operation to each of the winning reference numbers. Further, determining a K+1th selected lottery participation request may include: after determining a Kth selected lottery participation request corresponding to a Kth winning reference number, where K is an integer equal to or greater than 1 and equal to or less than N−1, N being a total number of lottery participation requests, decreasing by 1 the pool table values of the lottery participation requests that are greater than a pool table value corresponding to the Kth selected lottery participation request; updating the lottery pool to make a greatest pool table value, among the pool table values before decreasing the pool table values, to correspond to the Kth selected lottery participation request; and applying the modular operation on a K+1th winning reference number based on a number obtained by subtracting K from a number corresponding to the number of the lottery participation requests, thereby determining the K+1th selected lottery participation request with respect to the updated lottery pool.

In some embodiments, the generating at least one representative lottery pool information may include generating a plurality of representative lottery pool information, each representing a part of the lottery pool, by applying a hash operation to information associated with each part of the lottery pool.

In some embodiments, the representative lottery pool information, which is registered in the blockchain and available for viewing by a user, may be used as a reference for comparison with test lottery pool information that is generated by the user based on published information associated with the lottery pool and published information associated with a hash operation.

According to another aspect of the present invention, there is provided a service server that performs a lottery transparently and fairly while using a blockchain at a low cost by performing fewer transactions. The service server may include one or more memories for storing instructions, and one or more processors configured to execute the instructions, and the processor, when the instructions are executed, may be configured to: obtain a plurality of lottery participation requests; generate a lottery pool by assigning pool table values to the plurality of lottery participation requests; generate at least one representative lottery pool information using information associated with the lottery pool, and transmit the representative lottery pool information to a blockchain network; register the transmitted representative lottery pool information or processed information thereof in the blockchain network; request a lottery smart contract previously registered in the blockchain network to generate at least one winning reference number and to register the generated winning reference number in the blockchain network; and determine, or cause another device to determine, at least one selected lottery participation request as a winner among the plurality of lottery participation requests with reference to the winning reference number.

In some embodiments, the processor may be further configured to request the lottery smart contract to transmit the winning reference number to the service server or to the another device such that the determining at least one selected lottery participation request as a winner may be performed by the service server or the another device.

In some embodiments, the processor may be configured to generate the representative lottery pool information that represents the lottery pool by applying at least one hash operation to the information associated with the lottery pool after extracting the information.

In some embodiments, for generating the winning reference number, the processor may be configured to cause the lottery smart contract to generate a random seed value using information on the blockchain network, and to generate the winning reference number using the random seed value.

In some embodiments, the information on the blockchain network may include at least some of (i) miner's address information of a particular block included in the blockchain network, (ii) difficulty information of the particular block, (iii) gas limit information of the particular block, (iv) number information of the particular block, (v) timestamp information corresponding to the particular block, and (vi) a particular hash value corresponding to the particular block.

In some embodiments, the processor may be configured to cause the lottery smart contract to generate a winning sequence that includes a plurality of winning reference numbers by performing a pseudo-random number generation using the random seed value.

In some embodiments, the processor may be configured to cause the lottery smart contract to perform the pseudo-random number generation according to an equation, $$X_{n+1} = (aX_n + c) \mod M$$

where a and c are arbitrary constants, M is a number equal to or greater than a number of lottery participation requests, and $X_{n+1}$ and $X_n$ are numbers that are recursively generated using the equation starting from $X_0$, which corresponds to the random seed value.

In some embodiments, selected lottery participation requests may be determined by obtaining the generated winning reference numbers in an order of generation, and by applying a modular operation to each of the winning reference numbers. Further, determining a K+1th selected lottery participation request may include: after determining a Kth selected lottery participation request corresponding to a Kth winning reference number, where K is an integer equal to or greater than 1 and equal to or less than N−1, N being a total number of lottery participation requests, decreasing by 1 the pool table values of the lottery participation requests that are greater than a pool table value corresponding to the Kth selected lottery participation request; updating the lottery pool to make a greatest pool table value, among the pool table values before decreasing the pool table values, to correspond to the Kth selected lottery participation request; and applying the modular operation on a K+1th winning reference number based on a number obtained by subtracting K from a number corresponding to the number of the lottery participation requests, thereby determining the K+1th selected lottery participation request with respect to the updated lottery pool.

In some embodiments, for the generating at least one representative lottery pool information, the processor may be configured to generate a plurality of representative lottery pool information, each representing a part of the lottery pool, by applying a hash operation to information associated with each part of the lottery pool.

In some embodiments, the representative lottery pool information, which is registered in the blockchain and available for viewing by a user, may be used as a reference for comparison with test lottery pool information that is generated by the user based on published information associated with the lottery pool and published information associated with a hash operation.

According to the present invention, a lottery may be performed fairly using a selective algorithm based on the situations by storing the factors for the lottery in the blockchain network, allowing the resources to be distributed in an equitable way such that the applicants can trust the lottery method.

DETAILED DESCRIPTION

Figure 1:
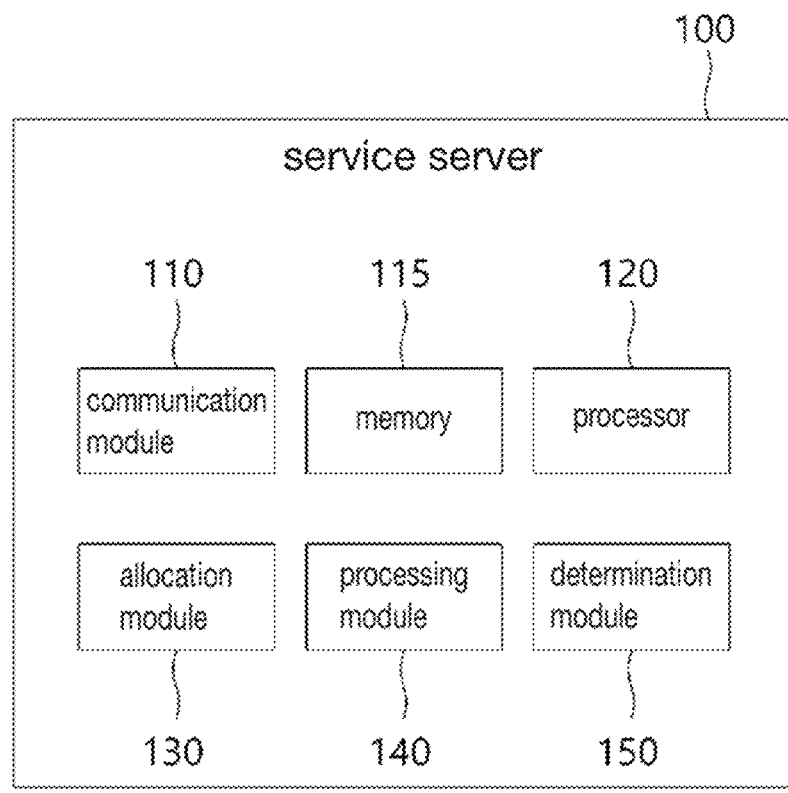
FIG. 1 is a schematic diagram showing the configuration of a service server for performing a method of performing a fair lottery while reducing transaction costs using a blockchain network according to an exemplary embodiment of the present invention.

Reference is made to the accompanying drawings, which show by way of illustration exemplary embodiments in which the present invention may be implemented. These examples are described in sufficient detail to allow the invention to be implemented by those skilled in the art. It should be understood that the various exemplary embodiments of the present invention may be different but need not be mutually exclusive. For example, certain shapes, structures, and characteristics described herein with respect to one exemplary embodiment may be implemented in other embodiments without departing from the spirit and scope of the invention. In addition, it should be understood that the location or arrangement of individual components within each disclosed exemplary embodiment may be modified without departing from the spirit and scope of the present invention. Accordingly, the detailed description set forth below is not intended to be taken in a limiting sense, and the scope of the present invention, if properly described, is limited only by the appended claims, along with all scopes equivalent to those claimed. Like reference numerals in the drawings refer to the same or similar functions throughout the various aspects.

Hereinafter, in order to enable those of ordinary skill in the art to easily practice the present invention, preferred exemplary embodiments of the present invention will be described in detail with reference to the accompanying drawings.

FIG. 1 is a schematic diagram showing the configuration of a service server for performing a method of performing a fair lottery while reducing transaction costs using a blockchain network according to an exemplary embodiment of the present invention.

Referring to FIG. 1, a service server 100 may include an allocation module 130, a processing module 140, and a determination module 150. Here, input/output and calculation processes of the allocation module 130, the processing module 140, and the determination module 150 may be performed by a communication unit 110 and a processor 120. However, in FIG. 1, a detailed connection relationship between the communication unit 110 and the processor 120 is omitted. Further, a memory 115 may be in a state in which various instructions to be described later are stored, and the processor 120 may be configured to execute the instructions stored in the memory 115. As such, the present invention can be carried out as the processor 120 performs the processes described herein. Whereas FIG. 1 depicts as though the processor 120 is separately provided from the memory 115, in some embodiments, the service server 100 may include an integrated processor, in which a medium for storing program instructions implementing the methods of the present invention, a processor, and a memory are integrated.

Hereinabove, the service server 100 has been described, and reference will now be made to FIG. 2 to describe a blockchain network 200 in communication with the service server 100 and its interworking relationship.

Figure 2:
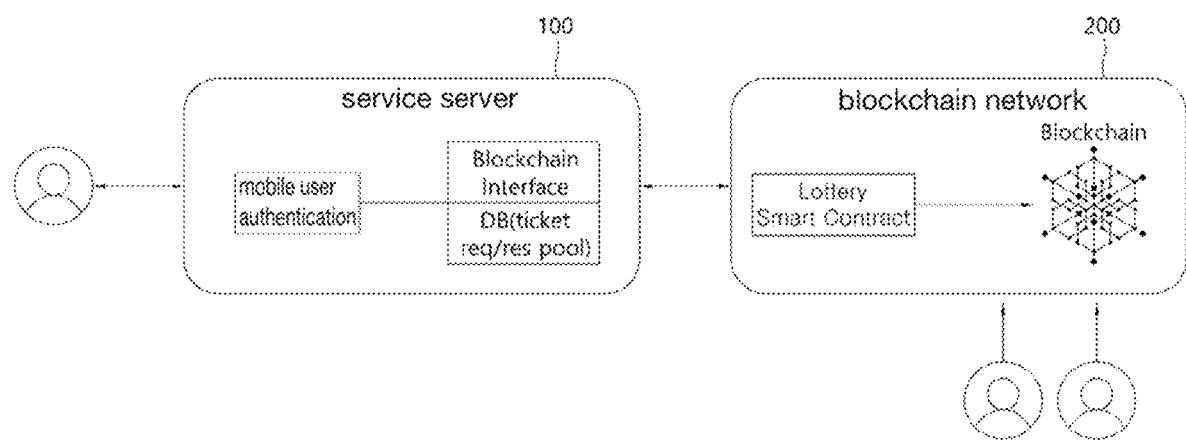
FIG. 2 is a schematic diagram showing the overall configuration of a method of performing a fair lottery while reducing transaction costs using a blockchain network according to an exemplary embodiment of the present invention.

FIG. 2 is a schematic diagram showing the overall configuration of a method of performing a fair lottery while reducing transaction costs using a blockchain network according to an exemplary embodiment of the present invention.

Since the blockchain network 200 in communication with the service server 100 is required to have registered a lottery smart contract, which will be described later, it may be a blockchain adopting a smart contract technique, such as an Ethereum network. However, the present invention is not limited thereto. As described above, the service server 100 and the blockchain network 200 can exchange data by interacting with each other, and an API may be used in this process. The term "smart contract" or "lottery smart contract," as used herein, may refer to a computer program or a transaction protocol which is intended for self-execution, control, or documentation of relevant events and actions according to the terms of a contract or an agreement when predetermined terms and conditions are met.

Hereinafter, referring to FIG. 3, the lottery method of the present invention will be described in detail.

Figure 3:
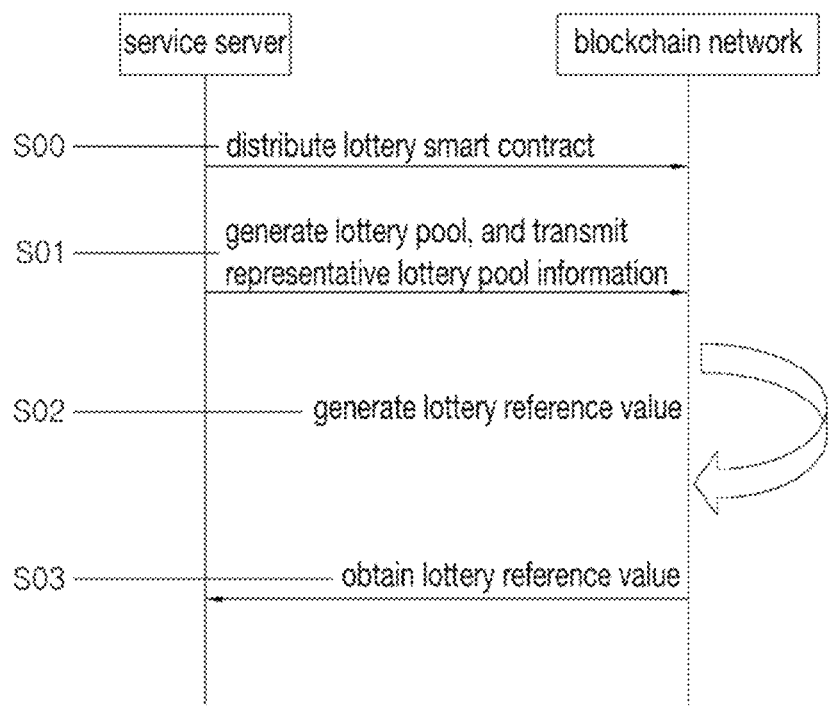
FIG. 3 is a flowchart illustrating a method of performing a fair lottery while reducing transaction costs using a blockchain network according to an exemplary embodiment of the present invention.

FIG. 3 is a flowchart illustrating a method of performing a fair lottery while reducing transaction costs using a blockchain network according to an exemplary embodiment of the present invention.

In general, the service server 100 may have previously distributed the lottery smart contract to the blockchain network 200 (S00). This step may be performed before the lottery process of the present invention begins. Thereafter, the service server 100 may generate a lottery pool, which will be described later, and then transmit representative lottery pool information that represents the lottery pool to the blockchain network 200 (S01). Subsequently, the service server 100 may cause the blockchain network 200 to generate a lottery reference value (S02), and after obtaining the lottery reference value, the service server 100 may determine a selected user terminal by using the lottery reference value (S03). With this general configuration, the method will be described in more detail below.

First, the service server 100 may obtain a plurality of lottery participation requests from user terminals. Here, the user terminals may transmit the lottery participation requests via packets generated using the SSL standard. Accordingly, the lottery participation requests may be transmitted while maintaining confidentiality. Also, upon receiving the lottery participation requests, the service server 100 may verify the user terminals via mobile phone authentication. In some embodiments, no more than one lottery participation request may be transmitted to the service server 100 from one user terminal. In some such embodiments, the lottery participation request may include universally unique identifier (UUID) of the user terminal from which the lottery participation request is generated. In such embodiments, the lottery result may be determined on the user terminal basis, thereby rendering selected user terminals and selected lottery participation requests interchangeable. In some other embodiments, a plurality of lottery participation requests may be allowed to be transmitted from one user terminal to the service server 100. In such embodiments, the lottery result may be determined either on the lottery participation request basis or on the user terminal basis. In other words, depending on the design of the lottery, more than one lottery participation request originating from a same user terminal may be allowed to be selected as winners (i.e., on the lottery participation request basis), or still only one lottery participation request among the plurality of lottery participation requests originating from a same user terminal may be allowed to be selected as a winner (i.e., on the user terminal basis). Accordingly, herein, determining a selected user terminal may also refer to determining a selected lottery participation request, and vice versa.

Thereafter, the service server 100 may cause the allocation module 130 to generate the lottery pool by allocating a pool table value to each of the plurality of lottery participation requests. Each of the allocated pool table values may be set to contiguous integers to ensure interoperability with winning reference numbers, which will be described later, but is not limited thereto. For example, each of the pool table values may be an integer starting from 0, in the order in which the respective lottery participation requests are obtained.

Thereafter, the service server 100 may cause the processing module 140 to generate at least one representative lottery pool information based on the information associated with the lottery pool. By way of example, the representative lottery pool information may be generated by applying at least one hash operation to the information associated with the lottery pool after extracting the information.

The representative lottery pool information may be understood as information that contains information associated with the lottery pool in a condensed manner. As shown in the drawings, and as will be described later, the representative lottery pool information may be registered in the blockchain network 200 and posted so that other users can check it. It might be most straightforward if the entire lottery pool is registered in the blockchain network 200 without any manipulation. However, such implementation can increase the transaction costs since a large capacity is required for the transmission of the entire lottery pool.

Therefore, in the present invention, the representative lottery pool information containing the information associated with the lottery pool may be registered in the blockchain network 200, thereby reducing the transaction costs while still allowing the users (e.g., lottery participants) to validate the authenticity of the lottery pool. To this end, the entire lottery pool and information about the representative lottery pool information (e.g., a protocol used for the hash operation) may be published online (e.g., on a website) other than the blockchain network. By publishing the lottery pool and the hash operation, the users can trust the lottery process. In other words, the representative lottery pool information is registered in the blockchain network 200 as evidence that the manager of the service server 100 did not commit inequitable conducts such as tampering with the lottery pool. More specifically, any user can verify the reliability of the lottery pool by generating test lottery pool information using the published lottery pool and hash operation protocol and comparing the user-generated test lottery pool information with the registered representative lottery pool information.

In detail, the above-described information associated with the extracted lottery pool may include pool table values or binary values for each lottery participation request. That is, it may include the pool table values, the binary values, or both. Also, the hash operation may be an operation using a hash algorithm such as MD5 or SHA, but is not limited thereto.

In another exemplary embodiment, instead of generating one representative lottery pool information, a plurality of representative lottery pool information may be generated. More specifically, the service server 100 may cause the processing module 140 to generate a plurality of representative lottery pool information, each representing a part of the lottery pool, by applying a hash operation to information associated with each part of the lottery pool. For example, among the lottery participation requests, one representative lottery pool information representing lottery participation requests having a pool table value of 0 or above and 100 or below and another representative lottery pool information representing lottery participation requests having a pool table value of 101 or above and 200 or below may be generated.

Subsequent to at least one representative lottery pool information being generated, the service server 100 may deliver it to the blockchain network 200.

Thereafter, the service server 100 may register the delivered representative lottery pool information or the processed information thereof in the blockchain network 200. The processed information of the representative lottery pool information may be generated by applying another hash operation to the representative lottery pool information or applying a predetermined transformation operation to the representative lottery pool information.

Thereafter, the service server 100 may cause the lottery smart contract previously registered in the blockchain network 200 to generate at least one winning reference number and then register it in the blockchain network 200.

More specifically, the service server 100 may cause the lottery smart contract to generate a random seed value based on information associated with the blockchain network 200, and then to use the random seed value to generate the winning reference number. Here, the information associated with the blockchain network 200 may include at least some of (i) miner's address information of a particular block included in the blockchain network 200, (ii) difficulty information of a particular block, (iii) gas limit information of a particular block, (iv) number information of a particular block, (v) timestamp information corresponding to a particular block, and (vi) specific hash values corresponding to a particular block. The above-mentioned difficulty information of a particular block may be the mining difficulty of the particular block.

In addition, a particular block may be a block used when registering the representative lottery pool information in the blockchain network 200, or a block to be used when registering a winning reference number, which will be described later, in the blockchain network 200, or a block currently being used or a block that has been used in the past and stored by each node. Since each value is difficult to predict, using it as the random seed value may allow values close to random to be generated.

Accordingly, as an example, the service server 100 may generate the winning reference numbers by causing the lottery smart contract to use at least some of the above-described information as a random seed value, and by performing a pseudo-random number generation using this value to generate a winning sequence including a plurality of winning reference numbers.

The pseudo-random number generation may be performed according to the following equation.

$$X_{n+1}=(aX_a+c) \bmod M$$

In the above equation, a and c are arbitrary constants, and may be generally set to large prime numbers. M may be the number of lottery participation requests in some embodiments, or may be a large constant equal to or greater than a preset threshold in some other embodiments. $X_{n+1}$ and $X_n$ may be the winning reference numbers recursively generated from the equation starting from $X_0$ that corresponds to the random seed value.

Once the winning reference numbers are generated by the above-described method, the service server 100 may cause the smart contract to register the winning reference numbers in the blockchain network 200, and may cause the determination module 150 to determine at least one selected user terminal among the user terminals with reference to the winning reference numbers. In the above-described exemplary embodiment, since the winning sequence including the winning reference numbers is generated, user terminals whose pool table values correspond to the winning reference numbers may be selected. For example, if the winning sequence is 1, 7, 51, 78, user terminals having corresponding pool table values may be selected as the winners. In the other exemplary embodiment described above, user terminals may be selected using numbers that are in the same size range as the pool table values by performing a modular operation on the numbers included in the winning sequence with the number of lottery participation requests. For example, if the winning sequence includes 12583725, 6543864396, and 3496340 as the winning reference numbers, and the size of the lottery pool is 100, a modular operation using 100 may be applied to select user terminals corresponding to 25, 96, and 40 as the winners.

With respect to the process after the winning reference number is generated, the above description has been provided for a case where the winning reference number is generated and then transmitted back to the service server 100. However, in practice, the winning reference numbers do not need to be transmitted back to the service server 100. That is, when the winning reference numbers are generated, the service server 100 may cause the lottery smart contract to transmit the winning reference numbers to other devices. The other devices may include a terminal of another user or another server. Thereafter, the service server 100 may cause the other devices to determine selected user terminals as described above with reference to the winning reference numbers.

Hereinbelow, a modified exemplary embodiment that is capable of preventing a problem that may arise from overlapped winning reference numbers will be described below.

According to the modified exemplary embodiment, the service server 100 may cause the determination module 150 or the above-described other devices to obtain the winning reference numbers in the order in which they are generated, and then to apply the modular operation to each winning reference number to determine a selected user terminal. Further, in order to determine the K+1th selected user terminal (K is an integer equal to or greater than 1 and equal to or less than N−1, where N is the total number of user terminals to be selected as winners), after determining the Kth selected user terminal that corresponds to the Kth winning reference number, remove the Kth selected user terminal from the lottery pool, decrease pool table values of lottery participation requests having pool table values greater than the pool table value corresponding to the Kth selected user terminal by one, update the lottery pool table to make the pool table value that was the greatest before decreasing the pool table values to correspond to the Kth selected user terminal in the lottery pool, and subsequently determine the K+1th selected user terminal by applying a modular operation to the K+1th winning reference number using the number of lottery participation requests subtracted by K, with respect to the updated lottery pool. As can be seen from the description, this exemplary embodiment is based on an embodiment in which M is a constant equal to or greater than a predetermined threshold among the above-described embodiments. Here, using a number obtained by subtracting K from the number corresponding to the number of lottery participation requests is to conform to the above-described lottery pool update process whenever a user terminal is selected. This relationship will be more clearly described below with reference to FIG. 4.

Figure 4:
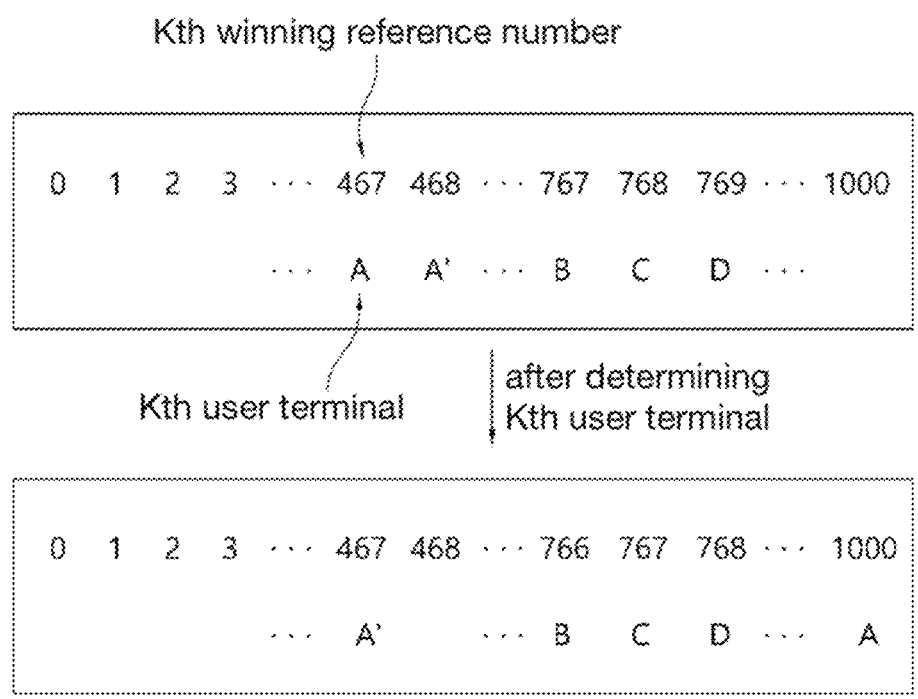
FIG. 4 is a schematic diagram illustrating a process of updating a lottery pool for a method of performing a fair lottery while reducing transaction costs using a blockchain network according to an exemplary embodiment of the present invention.

FIG. 4 is a schematic diagram illustrating a process of updating the lottery pool to perform a method of performing a fair lottery while reducing transaction costs using a blockchain network according to a modified exemplary embodiment of the present invention.

Referring to FIG. 4, the upper box of the drawing shows a status before the Kth selected user terminal is determined, and it can be seen that A has a pool table value of 467, A' has 468, and B, C, and D have 767, 768, and 769, respectively. If it is confirmed that the result of applying the modular operation to the Kth winning reference number is 467, A will be determined as the Kth selected user terminal. In this case, as shown in the lower box of FIG. 4, A is sent to the last place of the lottery pool, and the user terminals that were behind A can be advanced forward one by one. Accordingly, as shown in the drawing, the pool table value of A' will become 467, and the pool table values of B, C, and D will become 766, 767, and 768, respectively. Further, the pool table value of A will be 1000. Here, since the modular operation is applied to the winning reference numbers, and thus the value is decreased by one for this, the values sent back from the lottery pool will not be selected again. That is, if the value obtained by applying the modular operation to the Kth winning reference number ranges from 0 to 1000, the K+1th winning reference number may have a corresponding range from 0 to 999. However, the present invention is not limited to such an algorithm, and various modifications may be adopted.

One of the advantages of this exemplary embodiment is that even if the winning reference number is duplicated, the user terminal that actually wins the lottery will not be duplicated. In the example of FIG. 4, even if the K+1th winning reference number is confirmed as 467 again, A would not be selected as the K+1th selected user terminal again. Instead, A', which is another user terminal, will be determined as the K+1th selected user terminal.

Due to the above modified exemplary embodiment, even if the winning reference number is duplicated, potential problems may be prevented.

The exemplary embodiments according to the present invention described above may be implemented in the form of program instructions that can be executed through various computer components and recorded in a computer-readable recording medium. The computer-readable recording medium may include program instructions, data files, data structures, etc. alone or in combination. The program instructions recorded on the computer-readable recording medium may be specifically designed and configured for the present invention, or may be known and available to those skilled in the computer software field. Examples of the computer-readable recording medium include hard disks, magnetic media such as floppy disks and magnetic tapes, optical recording media such as CD-ROMs and DVDs, magneto-optical disks such as floptical disks, and hardware devices specifically configured to store and execute program instructions such as ROM, RAM, flash memory, and the like. Examples of program instructions include not only machine language codes such as those generated by a compiler, but also high-level language codes that can be executed by a computer using an interpreter or the like. The hardware device may be configured to operate as one or more software modules to perform processing according to the present invention, and vice versa.

In the foregoing, the present invention has been described with specific matters such as specific components and limited exemplary embodiments and drawings, but these are only provided to help a more general understanding of the present invention, and the present invention is not limited to the above exemplary embodiments. Those of ordinary skill in the art to which the present invention pertains can devise various modifications and variations from these descriptions.

Therefore, the spirit of the present invention should not be limited to the above-described exemplary embodiments. Rather, not only the claims described below, but also all equivalent modifications belong to the scope of the spirit of the present invention.

What is claimed is:

1. A method for conducting a lottery, comprising:
obtaining a plurality of lottery participation requests;
generating a lottery pool by assigning pool table values to the plurality of lottery participation requests;
generating at least one representative lottery pool information using information associated with the lottery pool, and transmitting the representative lottery pool information to a blockchain network;
registering the transmitted representative lottery pool information or processed information thereof in the blockchain network;
requesting a lottery smart contract previously registered in the blockchain network to generate at least one winning reference number and to register the winning reference number in the blockchain network; and
determining at least one selected lottery participation request as a winner among the plurality of lottery participation requests with reference to the winning reference number,
wherein the lottery smart contract is configured to:
generate a random seed value;
generate the winning reference number using the random seed value; and
generate a winning sequence that includes a plurality of winning reference numbers by performing a pseudo-random number generation using the random seed value according to an equation:

$$X_{n+1} = (aX_c + c) \bmod M$$

where a and c are arbitrary constants, M is a number equal to or greater than a number of lottery participation requests, and $X_{n+1}$ and $X_n$ are numbers that are recursively generated using the equation starting from $X_0$, which corresponds to the random seed value.

2. The method of claim 1, further comprising requesting the lottery smart contract to transmit the winning reference number to a service server or to another device such that the determining at least one selected lottery participation request as a winner is performed by the service server or the another device.

3. The method of claim 1, wherein the representative lottery pool information that represents the lottery pool is generated by applying at least one hash operation to the information associated with the lottery pool after extracting the information.

4. The method of claim 3, wherein the random seed value is generated using information on the blockchain network.

5. The method of claim 4, wherein the information on the blockchain network comprises at least some of (i) miner's address information of a particular block included in the blockchain network, (ii) difficulty information of the particular block, (iii) gas limit information of the particular block, (iv) number information of the particular block, (v) timestamp information corresponding to the particular block, and (vi) a particular hash value corresponding to the particular block.

6. The method of claim 1, wherein selected lottery participation requests are determined by obtaining the generated winning reference numbers in an order of generation, and by applying a modular operation to each of the winning reference numbers, and
wherein determining a K+1 th selected lottery participation request comprises:
after determining a Kth selected lottery participation request corresponding to a Kth winning reference number, where K is an integer equal to or greater than 1 and equal to or less than N−1, N being a total number of lottery participation requests, decreasing by 1 the pool table values of the lottery participation requests that are greater than a pool table value corresponding to the Kth selected lottery participation request;
updating the lottery pool to make a greatest pool table value, among the pool table values before decreasing the pool table values, to correspond to the Kth selected lottery participation request; and
applying the modular operation on a K+1 th winning reference number based on a number obtained by subtracting K from a number corresponding to the number of the lottery participation requests, thereby determining the K+1 th selected lottery participation request with respect to the updated lottery pool.

7. The method of claim 1, wherein the generating at least one representative lottery pool information comprises generating a plurality of representative lottery pool information, each representing a part of the lottery pool, by applying a hash operation to information associated with each part of the lottery pool.

8. The method of claim 1, wherein the representative lottery pool information, which is registered in the blockchain network and available for viewing by a user, is used as a reference for comparison with test lottery pool information that is generated by the user based on published information associated with the lottery pool and published information associated with a hash operation.

9. A service server that performs a lottery, comprising:
at least one memory for storing instructions; and
at least one processor configured to execute the instructions,
wherein, when the instructions are executed, the processor is configured to:
obtain a plurality of lottery participation requests;
generate a lottery pool by assigning pool table values to the plurality of lottery participation requests;
generate at least one representative lottery pool information using information associated with the lottery pool, and transmit the representative lottery pool information to a blockchain network;
register the transmitted representative lottery pool information or processed information thereof in the blockchain network;
request a lottery smart contract previously registered in the blockchain network to generate at least one winning reference number and to register the winning reference number in the blockchain network; and determine, or cause another device to determine, at least one selected lottery participation request as a winner among the plurality of lottery participation requests with reference to the winning reference number, and wherein the lottery smart contract is configured to:
generate a random seed value;
generate the winning reference number using the random seed value; and
generate a winning sequence that includes a plurality of winning reference numbers by performing a pseudo-random number generation using the random seed value according to an equation:

$$X_{n+1} = (aX_n + c) \bmod M$$

where a and c are arbitrary constants, M is a number equal to or greater than a number of lottery participation requests, and $X_{n-1}$ and $X_n$ are numbers that are recursively generated using the equation starting from $X_0$, which corresponds to the random seed value.

10. The service server of claim 9, the processor is further configured to request the lottery smart contract to transmit the winning reference number to the service server or to the another device such that the determining at least one selected lottery participation requests as a winner is performed by the service server or the another device.

11. The service server of claim 9, wherein the processor is configured to generate the representative lottery pool information that represents the lottery pool by applying at least one hash operation to the information associated with the lottery pool after extracting the information.

12. The service server of claim 11, wherein the random seed value is generated using information on the blockchain network.

13. The service server of claim 12, wherein the information on the blockchain network comprises at least some of (i) miner's address information of a particular block included in the blockchain network, (ii) difficulty information of the particular block, (iii) gas limit information of the particular block, (iv) number information of the particular block, (v) timestamp information corresponding to the particular block, and (vi) a particular hash value corresponding to the particular block.

14. The service server of claim 9, wherein selected lottery participation requests are determined by obtaining the generated winning reference numbers in an order of generation, and by applying a modular operation to each of the winning reference numbers, and wherein determining a K+1 th selected lottery participation request comprises:
after determining a Kth selected lottery participation request corresponding to a Kth winning reference number, where K is an integer equal to or greater than 1 and equal to or less than N−1, N being a total number of lottery participation requests, decreasing by 1 the pool table values of the lottery participation requests that are greater than a pool table value corresponding to the Kth selected lottery participation request;
updating the lottery pool to make a greatest pool table value, among the pool table values before decreasing the pool table values, to correspond to the Kth selected lottery participation request; and
applying the modular operation on a K+1 th winning reference number based on a number obtained by subtracting K from a number corresponding to the number of the lottery participation requests, thereby determining the K+1 th selected lottery participation request with respect to the updated lottery pool.

15. The service server of claim 9, wherein, for the generating at least one representative lottery pool information, the processor is configured to generate a plurality of representative lottery pool information, each representing a part of the lottery pool, by applying a hash operation to information associated with each part of the lottery pool.

16. The service server of claim 9, wherein the representative lottery pool information, which is registered in the blockchain network and available for viewing by a user, is used as a reference for comparison with test lottery pool information that is generated by the user based on published information associated with the lottery pool and published information associated with a hash operation.

* * * * *